July 24, 1962

R. W. HART 3,045,491

DYNAMIC PRESSURE SENSITIVE DETECTOR

Filed Dec. 16, 1958

INVENTOR.
*Robert W. Hart*
BY

July 24, 1962  R. W. HART  3,045,491
DYNAMIC PRESSURE SENSITIVE DETECTOR
Filed Dec. 16, 1958  3 Sheets-Sheet 2

INVENTOR.
Robert W. Hart
BY

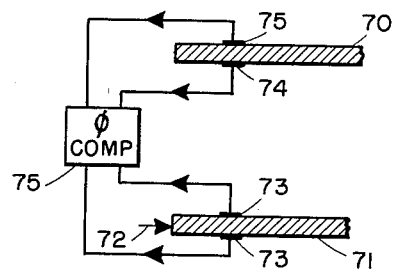
Fig. 7
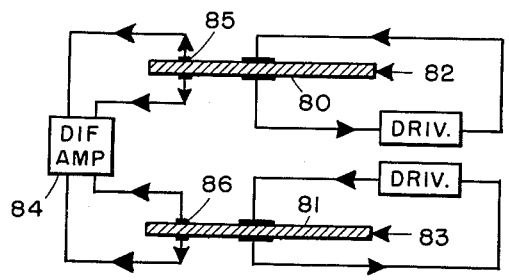
Fig. 8
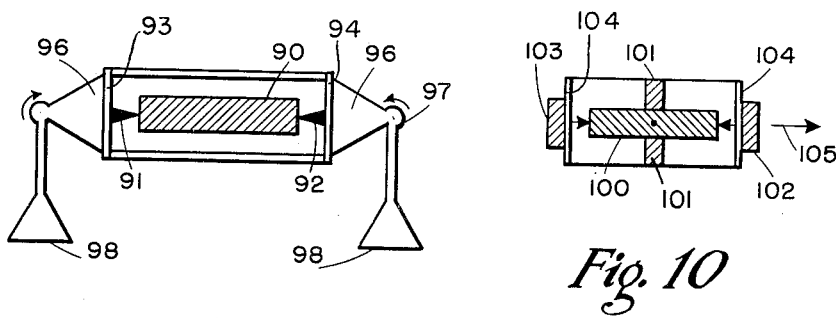
Fig. 9
Fig. 10

United States Patent Office 3,045,491
Patented July 24, 1962

3,045,491
DYNAMIC PRESSURE SENSITIVE DETECTOR
Robert W. Hart, 123 Dartmouth St., Lynn, Mass.
Filed Dec. 16, 1958, Ser. No. 780,912
9 Claims. (Cl. 73—398)
(Granted under Title 35, U.S. Code (1952), sec. 266)

The invention described herein may be manufactured and used by or for the Government of the United States of America for governmental purposes without the payment of any royalties thereon or therefor.

The present invention relates broadly to apparatus for and methods of detecting and measuring pressure variations and more particularly to a versatile pressure sensing device which possesses a high degree of sensitivity and develops an output signal in a frequency range higher than that of the pressure wave being measured.

Most of the prior art methods for determining pressure changes which have as their sensing pickup element an electromechanical transducer are of the quiescent kind. That is, the sensing device is normally in a passive condition and becomes active only when a disturbing pressure change appears thereat. For example, in the case of the piezoelectric crystal, perhaps the commonest pressure sensitive transducer, the crystal in its standby condition is motionless with no dynamic pressure applied thereto and no signal present across its electrical axes; and it remains in this static state until a stimulating pressure variation is applied to its mechanical axis.

Because the crystal is normally in a nonvibrating state, a certain amount of signal energy must be absorbed by the crystal before an output voltage appears at the electrical axis. This expenditure of energy is one of the factors that establish the threshold of signal sensitivity of the crystal pickup. The effective mass of the crystal also has an influence upon the frequency response of the crystal and its inability to detect and follow relatively fast changes in the intensity of the pressure stimulus.

In static pickup systems of the type just described, the output signal wave form developed by the transducer is a limited electrical voltage replica of the applied pressure wave. In low frequency detecting systems, this characteristic precludes the employment of radio frequency circuits and techniques for directly amplifying the output signal level and otherwise facilitating its examination. It hinders, also, signal analysis and identification and makes it relatively difficult to contuct an automatic wave analysis of the pressure configuration and ascertain rapidly the phase and/or frequency of input signals which have relatively long periods.

Briefly and in general terms, the pressure sensing pickup element of the present invention takes the form of a bar of elastic material which is excited to vibrate in a thickness shear mode at a locally selected frequency to set up a number of mechanical waves along the length of the bar. As a consequence of this mode of vibration, there is a specific plane within the material parallel to the direction of mechanical wave propagation whereat the particles of material do not experience any displacement as a result of this excitation and remain in a state of equilibrium with particles adjacent thereto. According to the present invention, the pressure to be detected is applied in this plane in a direction such that it varies the effective length of the elastic material. By so directing the application of the pressure, no coupling takes place between the mechanical waves set up in the material by the local exciting source and the source of the incoming pressure wave and, consequently, no wave interference. Likewise, there is no radiation from the vibrating member. Since the pressure wave modifies the effective length of the vibrating member, it disturbs the mechanical wave pattern that exists in the excited direction along the bar. Considering the length of the bar as measured in the number of wave lengths at the exciter frequency, this change in length of the bar can be accommodated by either a change in frequency of excitation with no change in the number of waves in the bar, or by a change in phase distribution along the bar with no change in the local frequency of excitation. In the first case, pressure sensing is by measurement of the change in exciter frequency; in the second case, pressure sensing is by measurement of change in phase of the wave distribution along the bar.

It would be pointed out that a change in effective length of the bar and the resulting upset to the wave configuration of the bar first reacts as a change in mechanical coupling between material particles nearest the neutral plane and this change is transmitted outward by wave motion toward the surface of the bar. If the material is magnetostrictive or piezoelectric, this change in coupling has a considerable effect on these properties.

In one preferred embodiment of the present invention, the vibrating element is a piezoelectric crystal cut to vibrate in a shear mode. As is well known, the piezoelectric crystal generates an output voltage when subjected to a change in pressure, with maximum response occurring at the resonant frequency of the crystal. However, in most cases where the crystal is sensing pressure variations, its dimensional deformation is only a very small percent of the wave length of the resonant frequency of the crystal. Consequently, its sensitivity is relatively poor. The present invention achieves an improved sensitivity by exciting the crystal at its resonant frequency from a local source, selecting its mode of vibration such that it does not itself radiate nor otherwise interfere with the incoming pressure wave, and choosing an excitation frequency such that a mechanical wave length in the bar is in the same order of magnitude as the mechanical deformation resulting from the pressure to be measured.

Other objects and many of the attendant advantages of this invention will be readily appreciated as the same becomes better understood by reference to the following detailed description when considered in connection with the accompanying drawings wherein.

Figure 1:
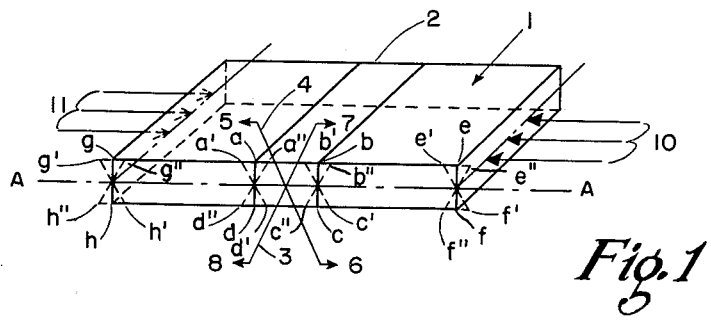
FIG. 1 illustrates the principle of operation of the vibrating pickup element of the present invention.
Figure 4:
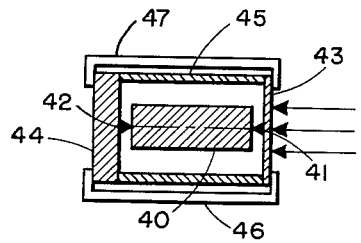
Figure 5:
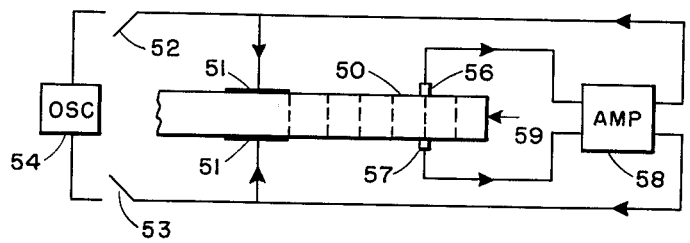
Figure 6:
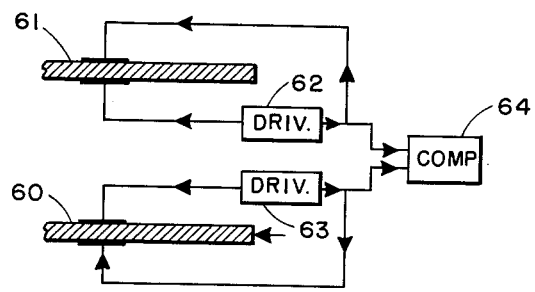

FIG. 4 schematically shows a pressure-sensitive pickup element embodying the principles of FIG. 1;

FIG. 5 depicts a method for driving and sustaining in vibration the pickup element wherein this element takes the form of a piezoelectric crystal;

FIG. 6 shows one arrangement for measuring the amplitude of a pressure wave detected by the vibrating pickup unit designed according to the present invention;

FIG. 7 shows an alternative method for accomplishing the same measurement;

FIG. 8 discloses a combination of vibrating pickup elements working as a differential pressure detector;

FIG. 9 shows one embodiment of the invention employed to determine the direction of a sound pressure source; and FIG. 10 illustrates a simplified accelerometer utilizing the pressure-sensitive pickup element of the present invention.

Referring now to FIG. 1, a volume of elastic material, generally represented by reference character 1 and preferably of a bar-shaped configuration, has its central portion 2 alternately subjected to pairs of equal, parallel forces acting in opposite directions, as schematically shown by stress couples 3 and 4, by means not shown. Thus, a stress is first applied to the top half of the bar in the direction of arrow 5 and simultaneously to the lower half in the direction of arrow 6. Then, following this, the direction of these stresses is reversed so that that in the upper half is now in the direction of arrow 7 and that in the lower half, in the direction of arrow 8. As a consequence of this, the midportion 2 is set into a thickness shear mode of vibration and each unit volume thereof, having for example a rectangular end face *abcd*, has this face successively distorted to a parallelogram face *a'b'c'd'* and *a"b"c"d"*. This vibration, it will be seen, is symmetrical with respect to a neutral plane A—A which is located midway between the upper and lower faces of volume 1 and, thus, all points along this plane remain in equilibrium and do not experience any displacement.

As is well known, if a vibratory disturbance appears at any point in a medium having sufficient continuity to transmit displacements from one part to another, a train of waves is propagated out from the seat of the disturbance. The velocity of propagation of these waves depends upon the closeness of coupling between adjacent particles of medium and the consequent magnitude of the restoring forces and upon whatever reaction of the medium corresponds to mechanical inertia.

It will thus be appreciated that when the central portion of volume 1 is driven by forces which result in the volumetric changes so described, a series of mechanical shear waves will be propagated outwardly to each extremity. Thus, the complete length of the bar will be set in thickness shear vibration and edges *efgh* will be cyclically displaced from their equilibrium positions to their single and double prime locations. Bar 1, of course, will vibrate in either a single or a multinode condition, depending upon the relationship between its over-all length and the frequency of the driving force. That is, either a single wave or a multiplicity of waves will occupy the entire length of the bar. It should be understood that the shearing stresses previously referred to are applied over the entire central volume 2 so that this volume vibrates as a unit. If the length of this section is relatively large compared to a wave length of the driving frequency as measured in the elastic material, a minimum number of spurious waves will be generated in the bar.

From an examination of FIG. 1, it will be seen that maximum particle displacement occurs in the planes of the upper and lower faces of bar 1 and that midway between these faces, that is, in plane A—A, there is no particle displacement. It is this characteristic of a body vibrating in shear that is made use of in the present invention, for it is in this plane that the external pressure which are to be detected and measured are directed as shown by arrows 10 and 11. These pressures are restricted by means, which will hereinafter be described, so that they act solely along the above plane and in a direction such as to vary the over-all length of the bar.

Figure 1A:
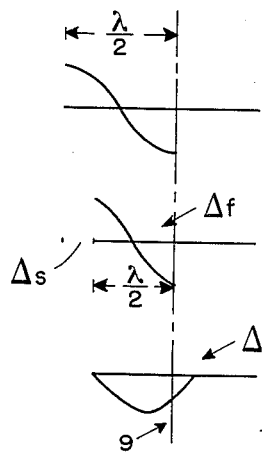
FIG. 1A depicts the various modes of vibration of the above pickup element.

Since the external pressures vary the length of the bar, it is obvious that the mechanical single wave or multiple wave pattern set up along the bar by the local oscillator source must change in order to accommodate itself to this new dimension. If the driving frequency is constant, then the number of waves or portions thereof existing along the over-all length of the bar must change, and this change can be detected by examining, for example, the phase of a particular cycle at a predetermined point along the bar. However, if the frequency of the local exciting source is free-running or determined in part by the dimensions of the vibrating bar 1, such as would be the case, for example, if this bar were a piezoelectric crystal controlling the frequency of the exciting source, then when the external pressures change the length of this bar, the frequency of the source will experience a similar change. The amount and direction of this change would be such as to have the local oscillator assume a new frequency which would tend to maintain the same number of wave lengths as originally existed along the bar prior to its deformation by the external pressure. In other words, if the bar is vibrating at a particular single or multinode, it tends to remain in this condition even when slight external forces try to change it. Consequently, the variable frequency exciting source will undergo a slight change in frequency, which change will be just sufficient to have the wave length of the mechanical vibrations modified to maintain constant the number of wave lengths along the new length of the bar. However, when the deformation is appreciable, the oscillator's change in frequency will be governed solely by the new parameters of the crystal. These two possible modes of operation are schematically depicted in FIG. 1A where the top line shows the bar vibrating in an unloaded condition with a loop at its end. In the middle line the bar has been shortened by an amount $\Delta s$ and the oscillator's frequency has increased to maintain a loop condition at this same end. In the bottom line the bar has been shortened and here the phase of the standing wave has changed indicating a situation where the oscillator's frequency cannot shift to compensate for the new length of the bar. It will thus be seen that electrodes located along line 9 will, in the latter case, detect changes in the phase of the wave pattern set up along the bar.

If bar 1 is vibrating at a high frequency, then, as stated hereinbefore, to derive maximum sensitivity the incremental change in its length due to a finite pressure wave should be of the same order of magnitude as the acoustic wave length in the elastic medium. This permits measurement of the change in length of the bar as a large fraction of the wave length. It will be appreciated, of course, that any shortening of the bar, for example, will be proportional to the pressure force applied thereto and to the length of the bar. The sensitivity of measurement, therefore, can be enhanced by increasing the length dimension or decreasing the wave length of the mechanical waves. The latter may be readily accomplished by increasing the exciting frequency and/or selecting a material having a relatively low velocity of propagation. In the case of a quartz crystal excited at five megacycles, the acoustic wave length is in the order of 0.05 millimeter, and a bar two inches long may contain 1000 acoustic wave lengths. As is well known, phase changes can be measured to an accuracy of 1° or better. Thus, the bar need only change by approximately one ten-thousandth (0.0001) of a millimeter at this frequency to provide this sensitivity.

With the above conditions the output signal at the oscillator or at the electrodes will be a frequency-modulated wave centered about 5 megacycles. This signal can therefore be directly amplified and detected with FM receiving apparatus. It would also be pointed out that the over-all result of the external pressure on the piezoelectric crystal in terms of frequency variation in the oscillator is greater than that due to its mechanical deformation alone, since the change in geometry of the crystal also influences its piezoelectric characteristic.

Figure 2:
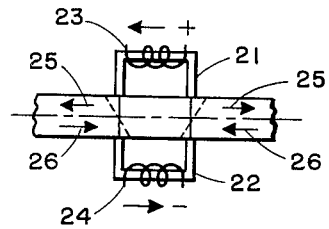
FIG. 2 illustrates one arrangement for driving the pickup element.

FIG. 2 schematically illustrates one arrangement for causing bar 1 to vibrate in thickness shear. Here a pair of U-shaped magnetostrictive members 21 and 22 are secured to opposite sides of the bar at its midportion with their corresponding ends in a confronting relationship. These members are magnetically polarized in the same direction by conventional bias windings. A pair of control windings 23 and 24 are wound on these members and energized with cyclically varying currents which instantaneously flow through these windings in opposite directions. This causes the upper U-shaped member to apply outwardly directed stresses 25 to the top portion of the bar and the lower U-shaped member to apply inwardly directed stresses 26 to the lower part of the bar. As a consequence, each unit volume of the bar has its end faces, as viewed in this figure, distorted to a trapezoid. This is illustrated by the solid and dotted lines in the midportion of the bar. When the current through these coils changes direction, a similar distortion occurs, but this time the longer base of the trapezoid is located along the lower edge of the plate.

Figure 3:
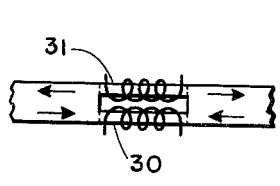
FIGS. 3 and 3A show alternative electromechanical methods for driving the sensing element.

In FIG. 3 there is another driving arrangement shown wherein a central portion of the bar is removed and the exciting windings 30 and 31 applied directly to the bar itself. Preferably, in this modification the whole length of the bar should be made of magnetostrictive material but, in any event, this must be true of the midportions thereof cooperating with the above windings. That is, these sections must undergo opposite changes in their length when subjected to oppositely varying magnetic fields. This type of excitation also causes each unit of volume to assume a trapezoidal configuration.

Figure 3A:
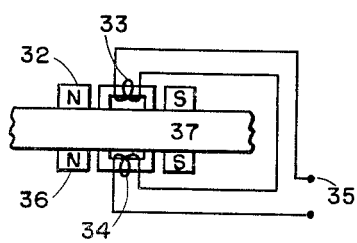

An electromagnetic drive is shown in FIG. 3A and comprises upper and lower pairs of magnetically polarized members 32 and 36 which are secured to the bar and enclose a pair of driving members 37. These members are magnetically polarized in opposite directions by means of a pair of serially connected coils 33 and 34 energized from source 35. Thus, when the left-hand end of the upper element 33 is a north pole, for example, the other end will be a south pole and the magnetic repulsion between these members and the adjacent polarized elements will cause outwardly going pressures to be applied to the top part of the bar. At the same time the reverse situation will occur in the lower part of the bar and inwardly directed pressures will be encountered here. Thus, the bar will vibrate in shear. When the direction of current from source 35 changes, the aforementioned forces reverse direction and bring about the other half cycle of the shear mode of vibration.

FIG. 4 schematically illustrates one very simple arrangement for mounting the vibrating pickup element so as to insure that the pressures to be measured are applied only along the equilibrium plane. In this arrangement vibrating element 40 is supported at its thickness midpoint by knife edges 41 and 42 and is free to vibrate in a shear mode. Knife edge 41 is associated with diaphragm 43 which has its outer face exposed to the external pressure waves, while knife edge 42 is fixed to a heavy backing plate 44. Both diaphragm 43 and backing plate 44 serve as the cover plates of a cylindrical member 45. Any conventional clamping arrangement, such as for example that shown by U-shaped members 46 and 47, may be employed to keep the assembly together with sufficient pressure being exerted on the crystal so as to maintain it in the position shown. With an assembly of this type the pressure wave impinging upon the outer surface of diaphragm 43 is directed by knife edge 41 along the neutral plane of vibrating member 40, thereby varying its effective length and causing the change in mechanical wave distribution mentioned hereinbefore.

Up to this point the vibrating element has been described merely as a volume of elastic material. However, there are several advantages to be gained by selecting as the vibrating element a piezoelectric crystal or a magnetostrictive element. In the former case, the thickness shear mode of vibration can be simply realized by selecting the proper crystal cut and by energizing it from a high frequency oscillator.

The use of such a piezoelectric crystal is shown in FIG. 5 wherein crystal 50, cut to vibrate in thickness shear, has a pair of electrodes 51 applied to its midsection. These electrodes are directly coupled via switches 52 and 53 to a high frequency oscillator 54. The frequency of the oscillator is selected to produce a multiplicity of mechanical wave lengths along the crystal. This condition is illustrated by the dotted vertical lines which represent nodal positions. Since the mechanical vibration of the piezoelectric crystal develops electrical potentials across its electrical axis, it is possible to utilize these voltages to drive the crystal once it is placed in vibration. To this end, pickup electrodes 56 and 57 are attached to the crystal near one of its ends and the voltages detected by these electrodes are fed to amplifier 58 which also feeds the main drive electrodes 51. The crystal thus provides a positive feedback path between the input and output of amplifier 58. The phase of this feedback can be altered by simply shifting the location of the pickup electrodes. It will be appreciated that once the crystal is set vibrating, oscillator 54 can be disconnected and the crystal will continue to vibrate because of the energy now supplied from amplifier 58. The pressure to be detected is applied in the manner schematically illustrated by arrow 59 and its magnitude is evaluated by observing any shift in the oscillator's frequency.

An alternative arrangement for detecting pressure variations is depicted schematically in FIG. 6. Instead of using a single vibrating element, the system proposed utilizes a pair of elements 60 and 61, the latter performing as a standard and having no external pressure applied to its equilibrium plane. Each vibrating element is excited by its own local driver 62 and 63. These drivers, which can be oscillators or amplifiers driven like amplifier 58 in FIG. 5, preferably should have the same design and possess similar frequency characteristics. The operation of this system is as follows: The incoming pressure is applied to crystal 60 and changes the frequency of driver 63 for the reasons heretofore set forth. Driver 62, however, holds to its frequency and, when the frequencies of both are compared in comparator 64, their beat frequency provides an indication of the intensity of the pressure wave deforming crystal 60.

FIG. 7 discloses a pressure-measuring system also employing a pair of vibrating crystal elements 70 and 71, only portions of which are shown. Both of these elements are driven by a single, highly stabilized oscillator. The pressure being detected is applied to vibrating element 71, as shown by arrow 72, and the deformation of this bar disturbs the mechanical wave pattern existing throughout its length. A pair of pickup electrodes mounted intermediate one end of this bar and its midportion detects the resultant change in phase of this wave. A similar pair of electrodes is affiliated with bar 70 which performs as a reference element, and the signals detected by both pairs of electrodes are fed to a phase comparator 75. This latter circuit gives an output voltage whose magnitude is proportional to the difference in phase of the two signals applied to its input circuits. The amplitude of this voltage, of course, is a function of the intensity of the pressure wave applied at point 72.

In the above discussion the pairs of vibrating members in FIGS. 6 and 7 were given piezoelectric properties. However, it should be understood that these elements can be magnetostrictive, in which case the electrodes would be replaced by pickup coils intimately coupled to the vibrating bars. It will also be appreciated that the self-exciting technique illustrated in FIG. 5 can be used in the arrangements of FIGS. 6 and 7 to sustain the thickness shear multinode mode of vibration.

FIG. 8 discloses a pair of vibrating elements 80 and 81 performing as a differential pressure detector. In this circuit the dissimilar pressures are applied as shown by arrows 82 and 83, and an indication of their difference is provided by differential amplifier 84 fed from pairs of electrodes 85 and 86 affiliated with each of the vibrating elements. The behavior of this circuit is similar to FIG. 7 except that the standard in the latter figure now has an unknown pressure applied to its equilibrium plane.

FIG. 9 discloses the use of a double-ended pressure detector for locating, for example, the direction of a sound source. Here, vibrating crystal 90 is supported by knife edges 91 and 92 which contact diaphragms 93 and 94. Coupled to each diaphragm, via a matching section 96 and a rotating joint 97, is a horn 98 which picks up and channels external sound pressure waves to the equilibrium plane of the crystal.

With an arrangement such as that shown, the crystal will undergo a change in length in accordance with the combined intensity of the pressure waves picked up by both horns 97. If these horns are both orientated in the direction of the sound source, that is, if the sound source is loacted on the perpendicular bisector of the line joining these horns, then the vibrating element will experience maximum deformation and the indicating apparatus will give a maximum reading, independent of whether this is in the form of a frequency or phase shift. Thus, to operate this apparatus it is only necessary to move both horns until a maximum output reading is obtained.

The vibrating pickup element of the present invention can also be employed to detect acceleration pressures. FIG. 10 shows a simplified accelerometer wherein vibrating crystal 100 is clamped at its midpoint by opposing insulators 101, and equal masses 102 and 103 are secured to flexible diaphragms 104, each of which is coupled to the equilibrium plane of the crystal as indicated by the arrows. If the assembly is accelerated, for example, in the direction of arrow 105, then mass 102 increases and mass 103 decreases the pressure on the crystal. This effect can be sensed by any of the techniques hereinbefore discussed. It should be appreciated that the apparatus can be rotated about an axis of the crystal which is parallel to its equilibrium plane so that the direction as well as the magnitude of acceleration can be determined.

Obviously many modifications and variations of the present invention are possible in the light of the above teachings. It is therefore to be understood that wihtin the scope of the appended claims the invention may be practiced otherwise than as specifically described.

What is claimed is:

1. A method of detecting pressure variations which comprises the steps of exciting a solid bar so as to have it vibrating in a shear mode at a frequency that is high compared with the time rate of change of the pressure variations which are being detected, applying said pressure variations along the plane of equilibrium of said vibrating bar in a direction such as to cause a deformation in the latter's length and measuring the change in the wave pattern along the new length of said bar.

2. The method of detecting pressure variations which comprises the steps of applying said pressure variations to the plane of equilibrium of a solid which is being driven so as to vibrate in a shear mode at a constant frequency that is high compared to the time rate of change of said pressure variations, the direction of application of said pressure variations corresponding to the direction in which particles of said solid are traveling and measuring the change in the particle wave pattern existing along said solid due to the latter's deformation by said pressure variations.

3. A pressure sensing device comprising a bar, means for exciting said bar so as to have it vibrate in thickness shear, the excitation frequency being such that a multiple wave pattern is set up along the length of said bar, means for applying the pressure to be detected along the equilibrium plane of said vibrating bar and in a direction corresponding to the length of said bar, said pressure deforming said bar and changing the wave pattern existing along the length thereof, and means for measuring the change in the wave pattern along the new length of said bar.

4. Apparatus for measuring pressure variations comprising, in combination, a free-running oscillator having as its frequency determining component a piezoelectric crystal vibrating in a thickness shear mode, means for applying pressure variations to the neutral plane of said crystal and in a direction such as to change the length thereof, and means for providing an indication of the shift in frequency of said oscillator brought about by the change in length of said crystal.

5. A pressure sensitive pickup element comprising a piezoelectric crystal cut to vibrate in thickness shear, means for exciting said crystal at a frequency which is high compared to the time rate of change of the pressure variations being detected, means for applying said pressure variations along the neutral plane of said crystal and in a direction parallel to the length thereof, and means for measuring changes in the phase of the wave pattern existing at one point along the length of said crystal and brought about by the application of said pressure variations.

6. Apparatus for measuring pressure variations comprising, in combination, a free-running oscillator, said oscillator having as its frequency control element a piezoelectric crystal vibrating in a thickness shear mode, the frequency of said oscillator being such that a multiple wave pattern exists along the length of said crystal, means for applying pressure variations along the neutral plane of said crystal in a direction parallel to the length thereof, said pressure variations modifying the length of said crystal and causing the frequency of said oscillator to shift by an amount and in a direction such as to keep constant the number of wave lengths existing along the changing length of said crystal, and means for providing an indication of the above shift in frequency of said oscillator.

7. Apparatus for measuring the sum of two pressure variations comprising a bar of elastic material vibrating in thickness shear at a frequency which is high compared to the time rate of change of the pressure variations being measured, means for applying said pressure variations to opposite end faces of said bar along the equilibrium plane of vibration thereof, said pressure variations changing the over-all length of said bar and disturbing the mechanical wave pattern originally set up there along, and means for measuring the change in phase of said wave pattern at a given point on said bar, thereby to provide an indication of the combined magnitude of the pressure variations acting on both end faces of said bar.

8. A pressure-detecting device comprising, in combination, a piezoelectric crystal vibrating in a thickness shear mode at a reference frequency, means for applying pressure variations only along a plane of said crystal in which minimum crystal motion occurs, and means for indicating the change in frequency of vibration of said crystal brought about by the dimensional changes accompanying the application of said pressure variations.

9. A method for detecting pressure variations which comprises the steps of initially exciting from an external source a piezoelectric crystal so as to have it vibrate in the shear mode at a frequency that is high compared with the time rate of change of the pressure variations which are being detected, detecting a voltage appearing along said piezoelectric crystal in response to said vibration and utilizing said voltage to maintain said crystal vibrating in a self-driven mode, applying said pressure variations along the plane of equilibrium of said vibrating crystal in a direction such as to cause the deformation in crystal's length and measuring the frequency at which said crystal now vibrates with said pressure applied thereto.

References Cited in the file of this patent

UNITED STATES PATENTS

| | | |
|---|---|---|
| 2,199,404 | House | May 7, 1940 |
| 2,534,847 | Auscher | Dec. 19, 1950 |
| 2,669,877 | Dunlap et al. | Feb. 23, 1954 |
| 2,713,796 | Herndon | June 26, 1955 |
| 2,726,074 | Ketchledge | Dec. 6, 1955 |
| 2,745,278 | Roberts et al. | May 15, 1956 |
| 2,800,647 | Baerwald et al. | July 23, 1957 |
| 2,945,192 | Seymanski | July 12, 1960 |